US012624056B2

(12) United States Patent
Katayama et al.

(10) Patent No.: US 12,624,056 B2
(45) Date of Patent: May 12, 2026

(54) ORGANIC TITANIUM COMPOUND AND CURING CATALYST

(71) Applicant: Shin-Etsu Chemical Co., Ltd., Tokyo (JP)

(72) Inventors: Taiki Katayama, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 529 days.

(21) Appl. No.: 18/269,836

(22) PCT Filed: Jan. 20, 2022

(86) PCT No.: PCT/JP2022/001924
§ 371 (c)(1),
(2) Date: Jun. 27, 2023

(87) PCT Pub. No.: WO2022/168613
PCT Pub. Date: Aug. 11, 2022

(65) Prior Publication Data
US 2024/0059842 A1       Feb. 22, 2024

(30) Foreign Application Priority Data
Feb. 2, 2021     (JP) .................................. 2021-014840

(51) Int. Cl.
| | |
|---|---|
| *C07F 7/28* | (2006.01) |
| *C08G 77/08* | (2006.01) |
| *C09D 183/04* | (2006.01) |

(52) U.S. Cl.
CPC ................ *C07F 7/28* (2013.01); *C08G 77/08* (2013.01); *C09D 183/04* (2013.01)

(58) Field of Classification Search
CPC .................................. C07F 7/28; C08G 77/08
See application file for complete search history.

(56) References Cited

U.S. PATENT DOCUMENTS

| | | |
|---|---|---|
| 4,438,039 A | 3/1984 | Beers et al. |
| 8,703,866 B2 | 4/2014 | Iwasaki et al. |
| 10,544,170 B2 | 1/2020 | Katayama et al. |
| 2007/0282061 A1 | 12/2007 | Kimura et al. |

| | | | |
|---|---|---|---|
| 2010/0130658 A1 | | 5/2010 | Iwasaki et al. |
| 2017/0321013 A1 | | 11/2017 | Klosowski et al. |
| 2019/0085002 A1 | | 3/2019 | Katayama et al. |

FOREIGN PATENT DOCUMENTS

| | | | | |
|---|---|---|---|---|
| CN | 102513156 | A | * | 6/2012 |
| JP | 39-27643 | B | | 12/1964 |
| JP | 2006-522199 | A | | 9/2006 |
| JP | 2007-131667 | | * | 5/2007 |
| JP | 2007-321123 | A | | 12/2007 |
| JP | 2010-126575 | A | | 6/2010 |
| JP | 4775600 | B2 | | 9/2011 |
| JP | 2016-69290 | A | | 5/2016 |
| JP | 2016-69345 | A | | 5/2016 |
| JP | 2019-112509 | A | | 7/2019 |
| JP | 6690704 | B2 | | 4/2020 |
| WO | WO 86/00084 | A1 | | 1/1986 |
| WO | WO 2004/094503 | A1 | | 11/2004 |

OTHER PUBLICATIONS

International Search Report for PCT/JP2022/001924 (PCT/ISA/210) mailed on Mar. 15, 2022.
Written Opinion of the International Searching Authority for PCT/JP2022/001924 (PCT/ISA/237) mailed on Mar. 15, 2022.
Extended European Search Report for European Application No. 22749489.5, dated Oct. 18, 2024.
Japanese Office Action for Japanese Application No. 2022-579430; dated Jul. 2, 2024, with an English translation.
Chinese Office Action and Search Report for Chinese Application No. 202280011483.8, dated Jan. 13, 2026, with English translation.

* cited by examiner

*Primary Examiner* — Marc S Zimmer
(74) *Attorney, Agent, or Firm* — Birch, Stewart, Kolasch & Birch, LLP

(57) ABSTRACT

Provided are an organic titanium compound and curing catalyst capable of quickly curing a room temperature-curable organopolysiloxane composition when added thereto, and improving an adhesiveness of a cured product of such composition, especially an adhesiveness thereof after being dipped in warm water, while maintaining an unimpaired storage stability. The organic titanium compound is a reaction product of an organooxy group- and chelating ligand-containing organic titanium compound represented by an average composition formula (I)

$$Ti(OR)_{4-a}(X)_a$$

wherein R is a substituted or unsubstituted monovalent hydrocarbon group having 1 to 12 carbon atoms, X is a chelating ligand, a is a number of 0.1 to 3.5; and
a fatty acid ester of a polyhydric alcohol.

9 Claims, No Drawings

ORGANIC TITANIUM COMPOUND AND CURING CATALYST

CROSS REFERENCE TO RELATED APPLICATIONS

This application is a National Stage application of PCT/JP2022/001924, filed Jan. 20, 2022, which claims the benefit of Japanese Application No. 2021-014840, filed Feb. 2, 2021, both of which are incorporated by reference in their entirety herein.

TECHNICAL FIELD

The present invention relates to a novel organic titanium compound useful as a curing catalyst for a room temperature-curable resin composition; and a curing catalyst comprised of such organic titanium compound.

BACKGROUND ART

Conventionally, as a curable resin composition yielding an elastomer elastic body (rubber cured product) when cured by cross-linking after undergoing a condensation reaction with water (moisture) in the air at room temperature (23° C.±15° C.), there is known a room temperature-curable resin composition such as a room temperature-curable organopolysiloxane composition. Such room temperature-curable resin composition is widely used in, for example, the construction, transportation, and electrical and electronic parts industries as it is superior in safety as well as durability and adhesiveness as a rubber. Adhesiveness in particular is often considered important because it greatly affects the reliability of the materials in which the composition is used.

Among room temperature-curable organopolysiloxane compositions, so-called one-component (one-part type) room temperature-curable organopolysiloxane compositions do not require cumbersome operations such as weighing or mixing a base polymer, a cross-linking material, a catalyst and the like immediately before use, whereby there shall occur no errors when combining the ingredients. Further, in the case of such type of room temperature-curable organopolysiloxane composition, since it generally has an excellent adhesiveness to a wide variety of base materials even when a primer is not used, the composition is widely used as, for example, an elastic adhesive agent or coating material in the electrical and electronics industries or the like, and a sealing material for construction. Such one-component room temperature-curable organopolysiloxane composition is often classified according to a compound released from the composition when it comes into contact with water in the air, typical example of which may include a deacetylation-type, deoximation-type, deamidation-type, dehydroxylamine-type, diacetone-type, and dealcoholization-type organopolysiloxane compositions. Among them, particularly preferred and used are dealcoholization-type organopolysiloxane compositions releasing alcohols when curing takes place, because, for example, these compositions produce less odor, do not corrode metals such as copper and iron, and have an excellent self-adhesiveness (adhesiveness to various base materials after curing when no primer is used) and adhesive durability.

However, while a one component- and dealcoholization-type organopolysiloxane composition has the abovementioned excellent properties during a short period of time after production, there have been observed flaws in storage stability such as the fact that, depending on the formulation, the kind of properties that are exhibited immediately after production will no longer be achieved as the time passes by during storage. Further, if stored under direct sunlight at the site of use, or if stored under a high-temperature environment exceeding 50° C. which is often conceivable when, for example, the composition is stored in a container during transportation, there shall occur a problem that, for example, not only there cannot be achieved the kind of properties that are exhibited immediately after production even after a relatively short period of storage, but curing failure may be observed as well.

One component- and dealcoholization-type organopolysiloxane compositions have long been proposed; a typical example thereof is a composition comprising an organopolysiloxane with its ends being blocked by hydroxyl groups, alkoxysilane and a titanium compound (Patent document 1).

In recent days, in regard to the room temperature-curable organopolysiloxane composition disclosed in Patent document 1, it has been disclosed that a composition further containing a polyhydric alcohol fatty acid ester as typified by triacetin is capable of being turned into a cured product superior in adhesiveness even when no primer is used, and has an excellent storage stability when in a sealed and packaged state (Patent document 2). Further, in Patent document 3, it is disclosed that storage stability can be improved by adding an organic silicon compound having a polyhydric alcohol fatty acid ester structure as typified by triacetin to a room temperature-curable organopolysiloxane composition.

PATENT DOCUMENTS

Prior Art Documents

Patent document 1: Japanese Examined Patent Publication Sho 39-27643
Patent document 2: Japanese Patent No. 4775600
Patent document 3: Japanese Patent No. 6690704

SUMMARY OF THE INVENTION

Problems to be Solved by the Invention

However, even when there is used the polyhydric alcohol fatty acid ester disclosed in Patent document 2 or the polyhydric alcohol fatty acid ester structure-containing organic silicon compound disclosed in Patent document 3, a sufficient adhesiveness cannot be necessarily imparted, particularly, there remains a problem with an adhesiveness after being dipped in warm water.

Thus, it is an object of the present invention to provide: an organic titanium compound capable of quickly curing a room temperature-curable organopolysiloxane composition such as a so-called silicone RTV rubber composition when added thereto, and improving an adhesiveness of a cured product of such composition, especially an adhesiveness thereof after being dipped in warm water, while maintaining an unimpaired storage stability; a method for producing such compound; and a curing catalyst containing such compound.

Means to Solve the Problems

The inventors of the present invention diligently conducted a series of studies to achieve the above object, and completed the invention by finding that the organic titanium compound shown below is useful for solving the aforementioned problems.

That is, the present invention is to provide the following organic titanium compound and curing catalyst.

[1]

An organic titanium compound as a reaction product of an organooxy group- and chelating ligand-containing organic titanium compound represented by an average composition formula (I)

$$Ti(OR)_{4-a}(X)_a$$

wherein R is a substituted or unsubstituted monovalent hydrocarbon group having 1 to 12 carbon atoms, X is a chelating ligand, a is a number of 0.1 to 3.5; and a fatty acid ester of a polyhydric alcohol.

[2]

The organic titanium compound according to [1], wherein in the average composition formula (I), the organooxy group represented by OR is an alkoxy group.

[3]

The organic titanium compound according to [1] or [2], wherein the chelating ligand is a β-ketoester chelate or a β-diketone chelate.

[4]

The organic titanium compound according to any one of [1] to [3], wherein the chelating ligand is ethyl acetoacetate chelate (ethyl acetoacetonato) or acetylacetone chelate (acetylacetonato).

[5]

The organic titanium compound according to any one of [1] to [4], wherein the fatty acid ester of a polyhydric alcohol is a fatty acid ester of ethylene glycol, propylene glycol, glycerol or pentaerythritol.

[6]

The organic titanium compound according to any one of [1] to [5], wherein the fatty acid ester of a polyhydric alcohol is at least one kind selected from triacetin, diacetin and monoacetin.

[7]

The organic titanium compound according to any one of [1] to [6], wherein the organic titanium compound is a reaction product in which a molar ratio between the organooxy group- and chelating ligand-containing organic titanium compound (I) represented by the average composition formula (I) and the fatty acid ester of a polyhydric alcohol is [organic titanium compound (I)]:[polyhydric alcohol fatty acid ester]=1:0.1 to 1:3.5.

[8]

A curing catalyst for a room temperature-curable resin composition, comprising the organic titanium compound according to any one of [1] to [7].

As for the organic titanium compound of the present invention that has been defined above, so long as an average structure as an organic titanium compound aggregate falls into the above ranges, that aggregate shall be included in the present invention even when there are differences in structure among the individual organic titanium compounds.

Further, the present invention also provides a curing catalyst for a room temperature-curable resin composition, which contains the aforesaid organic titanium compound.

Effects of the Invention

When added to a room temperature-curable organopolysiloxane composition such as a so-called silicone RTV rubber composition, the novel organic titanium compound of the present invention is capable of contributing to a storage stability of such composition when the composition is in an uncured state, yielding a silicone elastomer elastic body (silicone rubber cured product) by allowing the composition to be quickly crosslinked and cured via a condensation curing reaction under the presence of water (moisture) in the air at room temperature (23° C.±15° C.), and particularly improving an adhesiveness of such silicone rubber cured product after being dipped in warm water; therefore, the organic titanium compound is useful as a curing catalyst for a room temperature-curable organopolysiloxane composition (silicone RTV rubber composition).

MODE FOR CARRYING OUT THE INVENTION

The present invention is described in detail hereunder. However, the present invention shall not be limited to the ones described below.

<Organic Titanium Compound>

An organic titanium compound of the present invention is a reaction product of an organic titanium compound (I) and a fatty acid ester of a polyhydric alcohol, where the organic titanium compound (I) has an organooxy group(s) such as an alkoxy group and a chelating ligand(s), and is represented by an average composition formula (I): $Ti(OR)_{4-a}(X)_a$.

Here, in the above average composition formula (I), as R which is a substituted or unsubstituted monovalent hydrocarbon group having 1 to 12 carbon atoms, there can be listed, for example, an alkyl group such as a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, a nonyl group, a decyl group, and a dodecyl group; a cycloalkyl group such as a cyclopentyl group and a cyclohexyl group; an alkenyl group such as a vinyl group, an allyl group, a propenyl group, an isopropenyl group, a butenyl group, a pentenyl group, a hexenyl group, and a cyclohexenyl group; an aryl group such as a phenyl group, a tolyl group, a xylyl group, and an α-, β-naphthyl group; an aralkyl group such as a benzyl group, 2-phenylethyl group, and 3-phenylpropyl group; or groups obtained by substituting part of or all the hydrogen atoms in any of these groups with, for example, halogen atoms such as F, Cl and Br, cyano groups, or alkoxy groups such as a methoxy group and ethoxy group, examples of which may include 3-chloropropyl group, 3,3,3-trifluoropropyl group, 2-cyanoethyl group, methoxymethyl group, methoxyethyl group, ethoxymethyl group, and ethoxyethyl group. Among them, as R, preferred are alkyl groups such as a methyl group, an ethyl group, an isopropyl group, and a tert-butyl group; particularly preferred are an isopropyl group and a tert-butyl group.

Further, in the above average composition formula (I), as the monovalent group represented by OR (organooxy group), there can be listed, for example, an alkoxy group, cycloalkoxy group, alkenyloxy group, aryloxy group, aralkyloxy group and alkoxy-substituted alkoxy group that correspond to the substituted or unsubstituted monovalent hydrocarbon groups having 1 to 12 carbon atoms which are listed above as the examples of R. Among them, preferred are alkoxy groups such as a methoxy group, an ethoxy group, an isopropoxy group, a butoxy group, an isobutoxy group, a sec-butoxy group, and a tert-butoxy group; particularly preferred are an isopropoxy group and a tert-butoxy group.

In the above average composition formula (I), as the chelating ligand represented by X, there can be listed, for example, chelating ligands of β-ketoesters such as acetoacetic esters including methyl acetoacetate and ethyl acetoacetate, methyl pivaloyl acetate, methyl isobutyloyl acetate, ethyl benzoyl acetate, and methyl caproyl acetate; and chelating ligands of β-diketones such as acetylacetone, 3,5-heptanedione, dipivaloylmethane, trifluoroacetylacetone, hexafluoroacetylacetone, 1-phenyl-1,3-butanedione, and 1,3-diphenyl-1,3-propanedione. Among them, preferred are ethyl acetoacetate chelate (ethyl acetoacetonato) and acetylacetone chelate (acetylacetonato) which are readily available; particularly preferred is ethyl acetoacetate chelate (ethyl acetoacetonato).

In the above average composition formula (I), the average coordination number a of the chelating ligands to titanium is 0.1 to 3.5, more preferably 0.5 to 2.5, particularly preferably 1.0 to 2.0.

The fatty acid ester of a polyhydric alcohol may be a compound in which part of or all the alkoxy groups (one or more alkoxy groups) in the polyhydric alcohol molecule form an ester(s) with a fatty acid(s). As such fatty acid ester of a polyhydric alcohol, there can be listed, for example, an ethylene glycol derivative such as ethylene glycol diacetate (fatty acid ester of ethylene glycol); a propylene derivative such as propylene glycol diacetate (fatty acid ester of propylene glycol); a glycerol derivative such as triacetin (triacetyl glycerin, glycerin triacetate), diacetin (diacetyl glycerin, glycerin diacetate), monoacetin (monoacetyl glycerin, glycerin monoacetate), tributyrin, tricaprylin, tristearin, glycerol diacetate laurate, trimethylol propane tristearate, and trimethylol propane triacetate (fatty acid ester of glycerol); and a pentaerythritol derivative such as pentaerythritol monoacetate (fatty acid ester of pentaerythritol). Here, in terms of, for example, availability and molecular weight of the organic titanium compound obtained, preferred are triacetin, diacetin and monoacetin, of which triacetin is particularly preferred.

<Method for Producing Organic Titanium Compound>

The organic titanium compound of the present invention can, for example, be produced by the following method. That is, a β-ketoester or β-diketone is to be added dropwise to an organooxy titanium such as alkoxy titanium, where stirring is performed at room temperature or in a heated condition. Later, by distilling away the alcohol from the reaction solution, there is obtained an organooxy group- and chelating ligand-containing organic titanium compound (I) represented by the average composition formula (I). Next, a fatty acid ester of a polyhydric alcohol is to be added dropwise to the organic titanium compound (I) obtained, where stirring is performed at room temperature or in a heated condition. Later, by distilling away the fatty acid ester from the reaction solution, there can be obtained a target organic titanium compound.

A reaction amount ratio (molar ratio) between the organooxy group- and chelating ligand-containing organic titanium compound represented by the average composition formula (I) and the fatty acid ester of the polyhydric alcohol is preferably 1:0.1 to 1:3.5, more preferably 1:0.3 to 1:2, even more preferably 1:0.5 to 1:1, in terms of [organic titanium compound (I)]:[polyhydric alcohol fatty acid ester].

A solvent may be used as necessary during the above reaction, specific examples of which include a hydrocarbon-based solvent such as pentane, hexane, cyclohexane, heptane, isooctane, benzene, toluene, and xylene; an ether-based solvent such as diethyl ether, tetrahydrofuran, and dioxane; an ester-based solvent such as ethyl acetate and butyl acetate; and a chlorinated hydrocarbon-based solvent such as dichloromethane and chloroform. Any one kind of these solvents may be used alone, or two or more kinds of them may be used in a mixed manner.

There are no particular restrictions on a reaction temperature during the above reaction; the reaction can be performed at room temperature (23° C.±15° C.) or under a heated condition, preferably at a temperature of room temperature (23° C.±15° C.) to 200° C. In order to achieve an appropriate reaction speed, it is preferred that the reaction be performed under a heated condition; in this regard, the reaction temperature is more preferably 40 to 110° C., even more preferably 40 to 90° C. Further, there are no particular restrictions on a reaction time; it is preferred that the reaction time be 1 to 60 hours, more preferably 1 to 30 hours, even more preferably 1 to 20 hours.

The organic titanium compound of the present invention is obtained by reacting the organooxy group- and chelating ligand-containing organic titanium compound (I) with a fatty acid ester of a polyhydric alcohol; conceptually, the organic titanium compound of the present invention may be expressed by, for example, an average composition formula (II):

$$\mathrm{Ti(OR)}_{4-a-b}\mathrm{(Y)}_b\mathrm{(X)}_a$$

(in this formula, R, X and a are defined as above; Y is a polyhydric alcohol fatty acid ester residue present in the organic titanium compound of the present invention as a final product; b is a ratio of the polyhydric alcohol fatty acid ester residues present in the organic titanium compound of the present invention to titanium atoms, and is a number satisfying $0<b<0.5$). However, as for the molecular structure of the organic titanium compound of the present invention as the final product, it is not only difficult to accurately determine, of all the organooxy groups (OR) in the organic titanium compound (I) that is represented by the average composition formula (I): $\mathrm{Ti(OR)}_{4-a}\mathrm{(X)}_a$ and serves as an intermediate raw material, what percentage of them have been exchanged with the ester groups and/or alkoxy groups in the fatty acid ester of the polyhydric alcohol (i.e. it is difficult to accurately identify the value of b in the formula (II)); but also difficult to accurately determine the valence of the polyhydric alcohol fatty acid ester that has been exchanged with the organooxy group(s) (OR) in the organic titanium compound (I) (i.e. the number of sites at which the polyhydric alcohol fatty acid ester is bonded to Ti atoms in the molecule), and alkoxy groups and/or ester groups at which moiety in the polyhydric alcohol fatty acid ester contribute to the exchange reaction (i.e. the structure of Y in the formula (II)), because there are multiple reaction sites of the polyhydric alcohol fatty acid ester in the molecule. Thus, it is not possible to express the organic titanium compound of the present invention with a general formula (structure), or directly identify this compound via the properties thereof.

WORKING EXAMPLES

The present invention is described in detail hereunder with reference to working and comparative examples; however, the present invention shall not be limited to the following examples. Here, a normal pressure refers to 1 atmosphere, and a room temperature in the working examples refers to 25±5° C. Further, a viscosity is a value measured by a rotary viscometer (Brookfield-type rotary viscometer) at 25° C.

Working Example 1

Synthesis of Organic Titanium Compound 1

Here, 200 g (0.70 mol) of tetraisopropoxy titanium was put into a 500 ml separable flask, followed by delivering 92 g (0.70 mol) of ethyl acetoacetate thereinto by drops while performing stirring. After performing stirring at 50° C. for 2 hours, isopropanol produced as a byproduct was distilled away to obtain a product which was a yellow liquid and whose typical average structure was titanium triisopropoxy (ethyl acetoacetate) (i.e. a compound in which R=isopropyl group, X=ethyl acetoacetonato ligand, a=1.0 on average in the average composition formula (I)). Next, 77 g (0.35 mol) of triacetin was delivered thereinto by drops, where stirring was performed at 50° C. for 2 hours, followed by distilling away isopropyl acetate produced as a byproduct to obtain a target organic titanium compound 1 (i.e. a reaction product of a compound in which R=isopropyl group, X=ethyl acetoacetonato ligand, a=1.0 on average in the average composition formula (I) and triacetin, where a molar ratio therebetween was 1:0.5).

Working Example 2

Synthesis of Organic Titanium Compound 2
An organic titanium compound 2 (i.e. a reaction product of a compound in which R=isopropyl group, X=ethyl acetoacetonato ligand, a=1.0 on average in the average composition formula (I) and triacetin, where a molar ratio therebetween was 1:1) was obtained in a similar manner as the working example 1, except that there were used 154 g (0.70 mol) of triacetin.

Working Example 3

Synthesis of Organic Titanium Compound 3
An organic titanium compound 3 (i.e. a reaction product of a compound in which R=isopropyl group, X=ethyl acetoacetonato ligand, a=1.0 on average in the average composition formula (I) and diacetin, where a molar ratio therebetween was 1:1) was obtained in a similar manner as the working example 2, except that there were used 123 g (0.70 mol) of diacetin instead of triacetin.

Working Example 4

Synthesis of Organic Titanium Compound 4
An organic titanium compound 4 (i.e. a reaction product of a compound in which R=isopropyl group, X=ethyl acetoacetonato ligand, a=1.0 on average in the average composition formula (I) and tributyrin, where a molar ratio therebetween was 1:1) was obtained in a similar manner as the working example 2, except that there were used 212 g (0.70 mol) of tributyrin instead of triacetin.

Working Example 5

Synthesis of Organic Titanium Compound 5
An organic titanium compound 5 (i.e. a reaction product of a compound in which R=isopropyl group, X=acetylacetonato ligand, a=1.0 on average in the average composition formula (I) and triacetin, where a molar ratio therebetween was 1:0.5) was obtained in a similar manner as the working example 1, except that there were used 70 g (0.70 mol) of acetylacetone instead of ethyl acetoacetate.

Comparative Example 1

Synthesis of Organic Titanium Compound 6
An organic titanium compound 6 was obtained in a similar manner as the working example 1, except that ethyl acetoacetate was not used.

Comparative Example 2

Synthesis of Organic Titanium Compound 7
An organic titanium compound 7 was obtained in a similar manner as the working example 1, except that triacetin was not used.
Next, a composition was prepared using each of the organic titanium compounds synthesized in the working examples 1 to 5 and comparative examples 1 and 2 as well as a titanium diisopropoxybis (ethyl acetoacetate) (TC-750 by Matsumoto Fine Chemical Co., Ltd.).

Reference Example 1

There were uniformly mixed 100 parts of a dimethylpolysiloxane with both molecular chain ends being blocked by hydroxyl groups and having a viscosity of 50,000 mPa·s; 50 parts of a dimethylpolysiloxane with both molecular chain ends being blocked by trimethylsilyl groups and having a viscosity of 100 mPa·s, per 100 parts of the first dimethylpolysiloxane; 100 parts of a synthetic calcium carbonate (HAKUENKA CCR by SHIRAISHI CALCIUM KAISHA, LTD.) per 100 parts of the first dimethylpolysiloxane; and 100 parts of an untreated calcium carbonate (SUPER S by Maruo Calcium Co., Ltd.) per 100 parts of the first dimethylpolysiloxane. Next, per 100 parts of the first dimethylpolysiloxane with both molecular chain ends being blocked by hydroxyl groups, there were further added 9 parts of methyltrimethoxysilane and 4 parts of the organic titanium compound 1 synthesized in the working example 1, where mixing was uniformly performed under a moisture-blocked condition to obtain a one component- and dealcoholization-type organopolysiloxane composition 1.

Reference Example 2

A composition 2 was prepared in a similar manner as the reference example 1, except that there was added the organic titanium compound 2 synthesized in the working example 2 instead of the organic titanium compound 1.

Reference Example 3

A composition 3 was prepared in a similar manner as the reference example 1, except that there was added the organic titanium compound 3 synthesized in the working example 3 instead of the organic titanium compound 1.

Reference Example 4

A composition 4 was prepared in a similar manner as the reference example 1, except that there was added the organic titanium compound 4 synthesized in the working example 4 instead of the organic titanium compound 1.

Reference Example 5

A composition 5 was prepared in a similar manner as the reference example 1, except that there was added the organic titanium compound 5 synthesized in the working example 5 instead of the organic titanium compound 1.

Comparative Reference Example 1

Attempts were made to obtain a composition in a similar manner as the reference example 1 except that there was added the organic titanium compound 6 synthesized in the comparative example 1 instead of the organic titanium compound 1. However, a composition 6 failed to be obtained as viscosity increased significantly during the production process.

Comparative Reference Example 2

A composition 7 was prepared in a similar manner as the reference example 1 except that there was added the organic titanium compound 7 synthesized in the comparative example 2 instead of the organic titanium compound 1.

Comparative Reference Example 3

A composition 8 was prepared in a similar manner as the reference example 1 except that there was added a titanium diisopropoxybis (ethyl acetoacetate) (TC-750 by Matsumoto Fine Chemical Co., Ltd.) as a commercially available organic titanium compound instead of the organic titanium compound 1.

Comparative Reference Example 4

A composition 9 was prepared in a similar manner as the comparative reference example 3 except that there was added 1 part of triacetin.

Next, a physical property test, a storage stability test and a warm-water adhesiveness test were performed with regard to each of the compositions prepared in the reference examples 1 to 5 and comparative reference examples 1 to 4. The results of these tests are shown in Table 1.

[Physical Property]

The composition prepared was pushed out into a frame made of polyethylene, and was left at 23° C., 50% RH for 7 days so as to be cured, thereby obtaining a sheet having a thickness of 2 mm. The physical properties of this sheet were then measured in accordance with JIS K 6249.

[Storage Stability]

The composition was put into a polyethylene cartridge (volume 330 mL) for a sealing material, and the cartridge was then plugged with an inner stopper so as to be sealed. This cartridge was then stored in a dryer of 70° C. for 7 days before being taken out therefrom; the physical properties of the composition after being stored in a heated condition were measured in a similar manner as above.

[Warm-Water Adhesiveness Test]

The composition prepared was pushed out into the shape of a bead on a float glass, and was left at 23° C., 50% RH for 7 days so as to be cured, thereby obtaining a sample. This sample was later dipped in a warm water of 80° C. for 7 days and was then lifted therefrom, after which the bead was pulled in a 180° direction so as to evaluate adhesiveness. Examples where the cured product exhibited cohesion failure were evaluated as having a favorable adhesiveness and were marked "○"; and examples where the cured product had come off were evaluated as having an unfavorable adhesiveness and were marked "x."

TABLE 1

|  |  | Reference example 1 | Reference example 2 | Reference example 3 | Reference example 4 | Reference example 5 |
|---|---|---|---|---|---|---|
| Organic titanium compound |  | 1 | 2 | 3 | 4 | 5 |
| Physical property | Hardness Duro.A | 31 | 30 | 31 | 32 | 34 |
|  | Strength at maximum point (MPa) | 1.5 | 1.5 | 1.5 | 1.5 | 1.5 |
|  | Elongation at breaking point (%) | 460 | 650 | 480 | 480 | 460 |
| Storage stability | Hardness Duro.A | 20 | 21 | 21 | 21 | 23 |
|  | Strength at maximum point (MPa) | 1.0 | 1.3 | 0.9 | 1.1 | 1.0 |
|  | Elongation at breaking point (%) | 540 | 650 | 480 | 560 | 500 |
| Warm water adhesiveness |  | ○ | ○ | ○ | ○ | ○ |

|  |  | Comparative Reference example 1 | Comparative Reference example 2 | Comparative Reference example 3 | Comparative Reference example 4 |
|---|---|---|---|---|---|
| Organic titanium compound |  | 6 | 7 | TC-750 |  |
| Physical property | Hardness Duro.A | Preparation of composition failed | 25 | 27 | 28 |
|  | Strength at maximum point (MPa) |  | 1.3 | 1.3 | 1.4 |
|  | Elongation at breaking point (%) |  | 520 | 570 | 520 |

TABLE 1-continued

| Storage stability | Hardness Duro.A | Uncured | Uncured | 25 |
| | Strength at maximum point (MPa) | | | 1.4 |
| | Elongation at breaking point (%) | | | 540 |
| Warm water adhesiveness | | X | X | X |

As can be seen from the results shown in Table 1, it is clear that the organic titanium compounds of the present invention that were produced in the working examples 1 to 5 each contribute to an unimpaired storage stability and an improved adhesiveness after being dipped in warm water while maintaining a catalytic activity, as opposed to the organic titanium compounds produced in the comparative examples 1 and 2 and the existing organic titanium catalyst.

The invention claimed is:

1. An organic titanium compound as a reaction product of an organooxy group- and chelating ligand-containing organic titanium compound represented by an average composition formula (I)

$$Ti(OR)_{4-a}(X)_a$$

wherein R is a substituted or unsubstituted monovalent hydrocarbon group having 1 to 12 carbon atoms, X is a chelating ligand, a is a number of 0.1 to 3.5; and a fatty acid ester of a polyhydric alcohol.

2. The organic titanium compound according to claim 1, wherein in the average composition formula (I), the organooxy group represented by OR is an alkoxy group.

3. The organic titanium compound according to claim 1, wherein the chelating ligand is a β-ketoester chelate or a β-diketone chelate.

4. The organic titanium compound according to claim 1, wherein the chelating ligand is ethyl acetoacetate chelate (ethyl acetoacetonato) or acetylacetone chelate (acetylacetonato).

5. The organic titanium compound according to claim 1, wherein the fatty acid ester of a polyhydric alcohol is a fatty acid ester of ethylene glycol, propylene glycol, glycerol or pentaerythritol.

6. The organic titanium compound according to claim 1, wherein the fatty acid ester of a polyhydric alcohol is at least one kind selected from triacetin, diacetin and monoacetin.

7. The organic titanium compound according to claim 1, wherein the organic titanium compound is a reaction product in which a molar ratio between the organooxy group- and chelating ligand-containing organic titanium compound (I) represented by the average composition formula (I) and the fatty acid ester of a polyhydric alcohol is [organic titanium compound (I)]:[polyhydric alcohol fatty acid ester]=1:0.1 to 1:3.5.

8. A curing catalyst for a room temperature-curable resin composition, comprising the organic titanium compound according to claim 1.

9. A method for curing a room temperature-curable resin composition, comprising:

curing the room temperature-curable resin composition in the presence of the curing catalyst of claim 8.

* * * * *